Patented Aug. 7, 1951

2,563,602

UNITED STATES PATENT OFFICE 2,563,602

COPOLYMERS OF VINYL ACETATE AND VINYL HALOBENZOATES

George E. Ham and David T. Mowry, Dayton, Ohio, assignors to Monsanto Chemical Company, St. Louis, Mo., a corporation of Delaware No Drawing. Application March 27, 1948, Serial No. 17,583

6 Claims. (Cl. 260—85.7)

This invention relates to new copolymers of vinyl acetate having very desirable properties as are hereinafter described. More specifically the invention relates to a method of preparing new copolymers by the emulsion polymerization of vinyl acetate and substituted vinyl benzoates.

Polyvinyl acetate and numerous copolymers of vinyl acetate are well known and widely used, but their industrial applications are limited by the low heat and solvent resistances and the moderate tensile and flexural strengths of such compositions. Furthermore, copolymers of vinyl acetate and vinyl benzoate are known and have been prepared, but these copolymers are not thermoplastic and therefore cannot be used in the manner in which vinyl copolymers are customarily used.

In copending application, Serial No. 5,481, filed January 30, 1948, by George E. Ham, now abandoned, there are described and claimed new thermoplastic copolymers of vinyl acetate and vinyl benzoate and new methods of preparing them by solution polymerization techniques. In general, however, the solution polymerization is not as readily adapted to production methods as is the emulsion technique, but all attempts to copolymerize vinyl acetate and vinyl benzoate in emulsions have resulted in extremely low yields, which render the emulsion technique industrially impracticable.

The purpose of this invention is to provide methods of preparing thermoplastic vinyl acetate copolymers having physical properties substantially identical with the copolymers of vinyl acetate and vinyl benzoate, but which can be prepared by emulsion polymerization techniques. A further purpose of this invention is to provide new copolymers having very desirable heat and solvent resistance and which can readily be shaped by compression or injection molding techniques.

In accordance with this invention it has been found that copolymers of vinyl acetate and compounds having the structural formula:

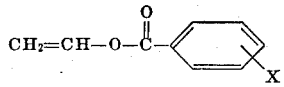

wherein X is a halogen, an alkyl, or an alkoxy radical, can be prepared in thermoplastic state by means of emulsion polymerization. Useful copolymers can be prepared using from 98 to 25 percent of vinyl acetate and from 2 to 75 percent of the substituted vinyl benzoate. Of particular importance are the copolymers of from five to 60 percent of the substituted vinyl benzoate and from 40 to 95 percent of vinyl acetate.

The new compositions are preferably prepared by charging the desired proportions of monomer gradually to an aqueous medium containing dissolved peroxy compounds and emulsion stabilizing agents. Suitable peroxide compounds for the practice of this invention are hydrogen peroxide, sodium peroxide, and water soluble salts of various peroxy acids, such as sodium perborate, potassium persulfate, potassium percarbonate, and ammonium persulfate, or any other water soluble compound containing the peroxy grouping (—O—O—). From 0.001 to 1.0 percent by weight of catalyst may be used. When the alkyl substituted vinyl benzoates are copolymerized with vinyl acetate, higher proportions of catalyst are required, for example from 0.1 to 3 percent.

Although the emulsion polymerization can be conducted with the reagents suspended in the aqueous emulsion with vigorous agitation, it is generally preferable to use a wetting agent, or an emulsion stabilizer. Suitable emulsion stabilizing agents are water soluble salts of long chain fatty acids, such as sodium stearate, the common "soaps" prepared by the saponification of animal or vegetable oils, the "rosin soaps," such as ammonium rosinate, or mixtures thereof as prepared from naturally occurring rosin acid mixtures, the amino soaps, such as triethanolamine and dodecyl methyl amine, the salts of half esters of sulfuric acid and long chain alkyl alcohols, such as sodium lauryl sulfate, salts of the sulfonated hydrocarbons, such as sodium alkyl benzene sulfonates, and in general any organic compound containing both hydrophobic and hydrophilic radicals. The emulsifying agents are preferably used to the extent of from 0.1 to 5 percent by weight of the monomer being copolymerized.

The polymerizations are conducted by mixing the monomers, water, catalyst, and emulsifier at temperatures from 50 to 90° C. The preferred method of polymerization involves the gradual addition of the monomer to the polymerization vessel which is maintained under the required conditions of polymerization. Although a wide variation is possible in the details of polymerization, the conditions which promote the formation of uniform physical and chemical properties are preferred. Uniform temperatures of operation may be obtained by operation at the reflux temperature of the reaction mass. Uniform concentration of emulsifying agents may be effected by adding all, or a substantial part, of emulsifying agent gradually, for example by mixing it with the monomer being charged. More uniform catalyst concentrations in the reactor can be achieved by charging only a small proportion of the required catalyst initially, and adding the balance continuously or periodically throughout the polymerization reaction. Since the proportions of monomer in the reaction vessel are usually substantially different from the proportions being polymerized, more uniform chemical compositions may be secured by initially charging the reaction vessel with that proportion of monomer which is required to produce the copolymer of desired proportions, and thereafter charging the vessel with comonomers in the proportions desired in the ultimate polymer. A further step towards achieving the ideal polymerization conditions can be effected by stopping the polymerization reaction as soon as all of the monomer has been introduced into the reaction, and thereby avoiding variation in chemical composition due to the depletion of one of the monomers. Further variations in polymerization methods are possible in accordance with the established procedure in the art.

Emulsion polymerizations are preferably conducted in glass or glass-lined vessels which are provided with a means of agitating the contents thereof. Generally, rotary stirring devices are the most effective means of assuring the intimate contact of the reactants, but other methods may be successfully employed by rocking or tumbling the reactors. The emulsion polymerization equipment generally used in the synthetic resin industry is useful.

The polymers prepared in accordance with this invention are readily maintained in emulsified state, and do not require the high water monomer ratios, or large proportions of emulsifying agents characteristic of vinyl acetate polymerization. The new compositions are particularly useful in the preparation of molding compositions, particularly those made by injection molding methods. Thus, the new method and the compounds prepared thereby are useful in fabricating thermoplastic molding compositions, surface coatings, and adhesives.

In copending application, Serial No. 17,581, filed March 27, 1948, by David T. Mowry and George E. Ham, now Patent No. 2,465,316, there are described and claimed the halogen ring-substituted vinyl benzoates, such as vinyl p-chlorobenzoate, vinyl p-fluorobenzoate, vinyl p-bromobenzoate, and the corresponding meta- and ortho-isomers. In copending application, Serial No. 17,582, filed March 27, 1948, by David T. Mowry and George E. Ham, now Patent No. 2,465,317, there are described and claimed alkoxy substituted vinyl benzoates, such as vinyl p-methoxybenzoate, vinyl p-ethoxybenzoate, vinyl p-n-propoxybenzoate, vinyl p-isoproxybenzoate, the various vinyl p-butoxybenzoates, and the corresponding meta- and ortho-isomers. The vinyl esters may be prepared by an ester interchange reaction between vinyl acetate and the substituted benzoic acid, in the presence of catalysts, such as mercury acetate. Alternatively the esters can be prepared from acetylene and the halogen or alkoxy ring substituted benzoic acids by contacting the reagents at elevated temperatures in the presence of catalysts, such as zinc, and cadmium compounds.

Further details of the practice of this invention are set forth with respect to the following examples.

Example 1

A 2-liter reaction flask was provided with a reflux condenser, a thermometer, a rotary stirrer, and was charged with 100 grams of distilled water, 0.15 gram of potassium persulfate and 1.5 grams of di-2-ethylhexyl sodium sulfosuccinate. A mixture of 75 grams of vinyl p-chlorobenzoate and 75 grams of vinyl acetate was charged through the top of the reflux condenser. The monomer was added dropwise at such a rate that the entire addition required seven hours. The reaction vessel was maintained at 75° C. throughout the reaction. After all the monomer had been added the emulsion was steam distilled to remove unreacted monomers, frozen to precipate the emulsion and thereafter filtered and dried by heating in a vacuum oven at 50° C. A yield of 92 percent of the theoretical was obtained. Upon analysis the composition was established as a copolymer of 54.3 percent of vinyl p-chlorobenzoate and the balance vinyl acetate.

Example 2

Using the procedure substantially identical to that described in the preceding example, 75 grams of vinyl p-chlorobenzoate and 228.5 grams of vinyl acetate were copolymerized in a period of four hours at 80° C. The resulting composition, obtained in a yield of 92.3 percent, was a copolymer of 29.4 percent of copolymerized vinyl p-chlorobenzoate.

Example 3

A 3-liter reaction flask, provided with a reflux condenser and a rotary stirring mechanism was charged with 800 grams of distilled water, 0.4 gram of potassium persulfate and 4 grams of di-2-ethylhexyl sodium sulfosuccinate. A mixture of 360 grams of vinyl acetate and 40 grams of vinyl p-chlorobenzoate was added over a period of five hours at 80° C. The resulting emulsion was freed of unreacted monomers by steam distillation until a temperature of 100° C. was observed. The copolymer was coagulated by freezing and after filtering was washed and dried at 40° C. A copolymer of 14.2 percent of vinyl p-chlorobenzoate was recovered in an 83.1 percent yield.

Sample test bars with a cross-section area 0.5 inch x 0.1 inch of each of the copolymers prepared in the preceding examples were made in compression molds. The measured tensile and flexural strengths, and the flex temperatures set forth in the following table manifest a substantial improvement over a comparable sample of polyvinyl acetate used as a control.

| | Percent Vinyl Acetate | °C. Flex Temp. | Tensile, p. s. i. | Flexural, p. s. i. |
|---|---|---|---|---|
| Example 1 | 45.7 | 56 | 6,825 | 14,000 |
| Example 2 | 70.5 | 33 | 5,650 | 11,500 |
| Example 3 | 85.8 | 28 | 4,100 | 8,350 |
| Control | 100 | 25 | 4,010 | 3,707 |

Example 4

Copolymers were prepared using mass polymerization methods and monomer proportions identical to those used in each of Examples 1, 2 and 3. The resulting compositions were non-thermoplastic gels which could not be molded into shapes for physical tests.

Example 5

Using a procedure analagous to that described in Example 1, a 2-liter flask was charged with 300 grams of distilled water, 0.08 gram of potassium persulfate and 0.5 gram of the sulfonated mahogany soap. A mixture of 15 grams of vinyl p-methoxybenzoate and 135 grams of vinyl acetate was added gradually over a period of five hours. When the reaction was completed, the resulting emulsion was rapidly steam distilled to remove unreacted monomers and a 73.3 percent yield of copolymer recovered. The emulsion was directly dried at 50° C. Compression molded test specimens were found to have a tensile strength of 6,550 pounds per square inch, and a flexural strength of 14,000 pounds per square inch.

*Example 6*

A flask containing 400 grams of distilled water, 0.1 percent of potassium persulfate catalyst and one gram of di-2-ethylhexyl sulfosuccinate was heated to 80° C., and was gradually charged with 20 grams of vinyl o-chlorobenzoate and 180 grams of vinyl acetate over a period of three hours. After the reagents had been combined the unreacted monomer was removed by steam distillation. The emulsion was coagulated by freezing and dried for twenty-four hours at 40° C. in a circulatory hot air oven. The copolymer, obtained in a 94.3 percent yield, was molded into test specimens which exhibited a tensile strength of 5,600 pounds per square inch, and a flexural strength of 10,900 pounds per square inch.

*Example 7*

Using the procedure substantially the same as Example 6, 50 grams of vinyl o-chlorobenzoate and 150 grams of vinyl acetate were copolymerized at 80° C. with the monomer added gradually over a period of three hours. A 91.5 percent yield of polymer was recovered. This polymer had a tensile strength of 6,700 pounds per square inch, and a flexural strength of 13,300 pounds per square inch.

*Example 8*

For the purpose of demonstrating the unusual effect of halo and alkoxy substituted vinyl benzoates, a copolymerization of 15 grams of vinyl benzoate and 135 grams of vinyl acetate was attempted under similar conditions. A much larger quantity of catalyst, 0.75 gram, was used and added in three increments at the outset of the reaction, after eight hours and after twenty-four hours. The reaction was continued for forty-eight hours at 70° C., but only 29.3 percent conversion was obtained. Another polymerization utilizing catalyst concentrations identical to those of Example 1, produced only a trace of copolymer.

*Example 9*

The procedure of Example 1, was used to polymerize a mixture of 75 percent by weight of vinyl acetate and 25 percent of vinyl p-toluate. The reaction rate was very slow and a very low yield of copolymer was obtained even after a prolonged reaction period.

*Example 10*

Vinyl p-toluate was copolymerized with vinyl acetate in 10:90 proportions using the procedure of Example 1, except with 0.3 percent by weight of catalyst which was added in three increments during the course of the reaction. The 94 percent yield of copolymer was obtaind. A molded specimen of the copolymer was found to have a flexural strength of 10,700 pounds per square inch.

Although the invention has been described with respect to specific embodiments, it is not intended that the details thereof shall be construed as limitations up the scope of the invention except to the extent incorporated in the following claims.

We claim:

1. A thermoplastic copolymer of from 40 to 95 percent of vinyl acetate and from 60 to five percent of vinyl halobenzoate.

2. A thermoplastic copolymer of from 40 to 95 percent of vinyl acetate and from 60 to five percent of vinyl p-chlorobenzoate.

3. A thermoplastic copolymer of from 40 to 95 percent of vinyl acetate and from 60 to five percent of vinyl o-chlorobenzoate.

4. A method of preparing copolymers of from five to 95 percent of vinyl acetate and from 95 to five percent of vinyl halobenzoate, which comprises gradually charging the mixed monomers to an aqueous medium containing a peroxy compound and an emulsion stabilizer dissolved therein at a temperature between 70 and 90° C., and separating the resulting copolymer.

5. A method of preparing copolymers of from five to 95 percent of vinyl acetate and from 95 to five percent of vinyl p-chlorobenzoate, which comprises gradually charging the mixed monomers to an aqueous medium containing a peroxy compound and an emulsion stabilizer dissolved therein at a temperature between 70 and 90° C., and separating the resulting copolymer.

6. A method of preparing copolymers of from five to 95 percent of vinyl acetate and from 95 to five percent of vinyl o-chlorobenzoate, which comprises gradually charging the mixed monomers to an aqueous medium containing a peroxy compound and an emulsion stabilizer dissolved therein at a temperature between 70 and 90° C., and separating the resulting copolymer.

GEORGE E. HAM.
DAVID T. MOWRY.

REFERENCES CITED

The following references are of record in the file of this patent:

UNITED STATES PATENTS

| Number | Name | Date |
|---|---|---|
| 2,118,864 | Reppe | May 31, 1938 |
| 2,144,067 | Kranzlein | Jan. 17, 1939 |

FOREIGN PATENTS

| Number | Country | Date |
|---|---|---|
| 395,478 | Great Britain | July 20, 1933 |
| 565,633 | Germany | Nov. 4, 1930 |